United States Patent [19]

Kashiwada et al.

[11] Patent Number: 5,719,747
[45] Date of Patent: Feb. 17, 1998

[54] INTERFACE UNIT FOR COMMUNICATION DEVICE WITH PARTS POSITIONED ON A PRINTED-WIRING BOARD FOR ACHIEVING DESIRABLE OPERATING CHARACTERISTICS

[75] Inventors: Kazuaki Kashiwada; Kenji Joukou; Akihiko Oka, all of Kawasaki, Japan

[73] Assignee: Fujitsu Limited, Kawasaki, Japan

[21] Appl. No.: 431,976

[22] Filed: May 1, 1995

Related U.S. Application Data

[63] Continuation of Ser. No. 49,298, Apr. 20, 1993, abandoned.

[30] Foreign Application Priority Data

Apr. 22, 1992 [JP] Japan .................. 4-103159

[51] Int. Cl.$^6$ ............................................. H04J 3/14
[52] U.S. Cl. .................. 361/760; 375/337; 370/540; 370/544; 370/536
[58] Field of Search .................. 370/112, 113, 370/532, 533, 535, 536, 537, 540, 544, 242; 375/220, 257, 377; 361/686, 760

[56] References Cited

U.S. PATENT DOCUMENTS

| | | | |
|---|---|---|---|
| 4,442,518 | 4/1984 | Morimoto | 370/16 |
| 4,727,541 | 2/1988 | Mori et al. | 370/112 |
| 4,862,457 | 8/1989 | Morimoto | 371/8 |
| 4,993,013 | 2/1991 | Shinada et al. | 370/112 |
| 5,197,068 | 3/1993 | Holien et al. | 370/110.4 |
| 5,228,030 | 7/1993 | Dresher | 375/108 |

Primary Examiner—Melvin Marcelo
Assistant Examiner—Jean B. Corrielus
Attorney, Agent, or Firm—Armstrong, Westerman, Hattori, McLeland & Naughton

[57] ABSTRACT

An interface unit having a digital hierarchy interface function for a communication device has parts disposed on a printed-wiring board in a Layout to maintain desired interface unit characteristics. The interface unit includes a plurality of parallel B/U converter blocks for converting bipolar signals in a plurality of channels into a plurality of unipolar signals, respectively, a plurality of parallel U/B converter blocks for converting unipolar signals in a plurality of channels into a plurality of bipolar signals, respectively, a connector disposed near the B/U converter blocks for connecting the B/U converter blocks to an external device, a shared processor LSI circuit connected to the B/U converter blocks and the U/B converter blocks and disposed near the U/B converter blocks, for interfacing the signals in the channels at a low speed, and a printed-wiring board supporting the B/U converter blocks, the U/B converter blocks, the connector, and the shared processor LSI circuit.

1 Claim, 6 Drawing Sheets

INTERFACE UNIT FOR COMMUNICATION DEVICE WITH PARTS POSITIONED ON A PRINTED-WIRING BOARD FOR ACHIEVING DESIRABLE OPERATING CHARACTERISTICS

This application is a continuation of application Ser. No. 08/049,298 filed Apr. 20, 1993, now abandoned.

BACKGROUND OF THE INVENTION

1. Field of the Invention

The present invention relates to an interface unit having a digital hierarchy interface function for a communication device and, more particularly, to such an interface unit having parts properly arranged along the flow of signals through the interface unit.

2. Description of the Related Art

With the rapid development in recent years of the technology of hierarchical digital multiplex communication devices, parts for use in such hierarchical digital multiplex communication devices have been so improved that there is a demand for an improved packaging technology for those parts.

Heretofore, the circuit of an interface unit for converting a digital hierarchy signal into an inter-unit interface signal in the communication device or converting an inter-unit interface signal into a digital hierarchy signal comprises a combination of hybrid integrated circuits (HICs) which are mounted on a printed-wiring board and interconnected.

Recent advances in surface-mount technology (SMT) and fabrication technology allow digital hierarchy interface units to be composed of SMT parts rather than high-added-vaLue parts such as HICs.

Interconnection patterns which interconnect high-added-value parts such as HICs on printed-wiring boards are relatively simple, posing no packaging problem. However, if many parts such as HICs are replaced with SMT parts and circuits with the same circuit functions are mounted on printed-wiring boards, then interconnection patterns on the printed-wiring boards are highly complex to the extent that it is difficult for interface units to have desired characteristics while satisfying the need for small-size interface units.

Specifically since interconnections are densely placed in a small wiring space, the interconnections may be positioned too closely to each other or extended too long depending on the layout of parts. As a result, the parts or the wiring patterns may interfere with each other, causing a faulty condition such as oscillation due to a positive feedback loop or mixing of a high-level signal with a low-level signal thereby to produce noise. Therefore, the conventional digital hierarchy interface unit of SMT parts is problematic in that it fails to satisfy desired characteristics, e.g., pulse mask characteristics relative to pulse waveforms and jitter characteristics relative to vibrations, of pulse phase, amplitude, and duration.

SUMMARY OF THE INVENTION

It is an object of the present invention to provide an interface unit for communication devices which has parts properly positioned on a printed-wiring board for achieving desired characteristics of the interface unit.

To accomplish the above object, there is provided in accordance with the present invention an interface unit having a digital hierarchy interface function for a communication device, comprising a plurality of parallel B/U converter means for converting bipolar signals in a plurality of channels into a plurality of unipoLar signals, respectively, a plurality of parallel U/B converter means for converting unipoLar signals in a plurality of channels into a plurality of bipolar signals, respectively, connecting means disposed near the B/U converter means for connecting the B/U converter means to an external device, shared processor means connected to the B/U converter means and the U/B converter means and disposed near the U/B converter means, for interfacing the signals in the channels at a Low speed, and a printed-wiring board supporting the B/U converter means, the U/B converter means, the connecting means, and the shared processor means.

Digital primary-rate bipolar signals supplied to the interface unit are transmitted successively from the connecting means through the B/U converter means and the shared processor means back to the connecting means. Input signals from a medium-speed interface are transmitted successively from the connecting means through the shared processor means and the U/B converter means back to the connecting means. Since the parts of the blocks of the interface unit are arranged along the flow of signals on the printed-wiring board, oscillation due to a positive feedback Loop and introduction of noise are avoided to maintain desired unit characteristics.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
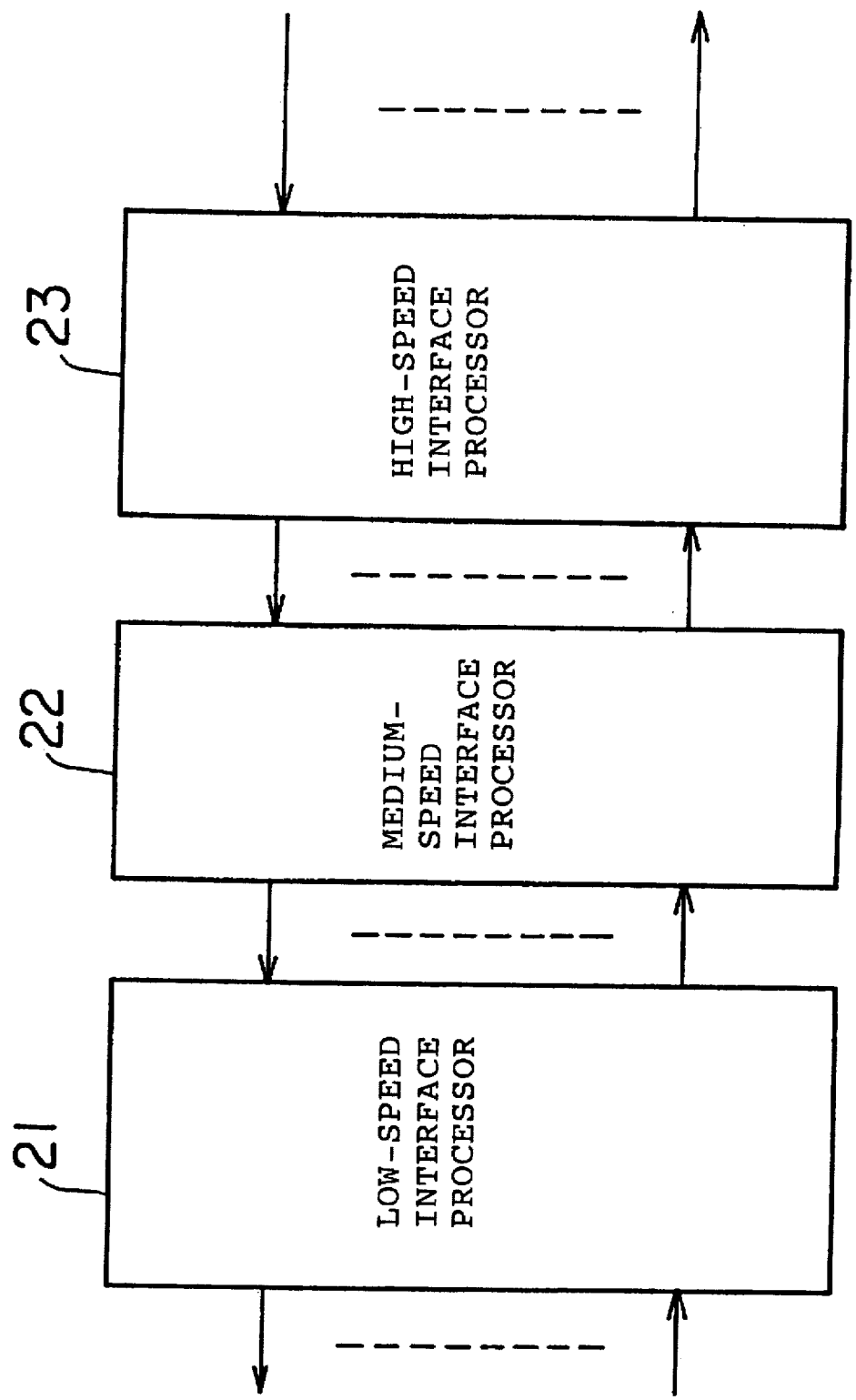
FIG. 1 is a block diagram of a hierarchical digital multiplex communication device.

FIG. 1 shows in block form a hierarchical digital multiplex communication device. As shown in FIG. 1, the hierarchical digital multiplex communication device includes a low-speed interface processor 21 for processing a digital primary-rate interface signal into a multiplex signal and applying the multiplex signal to a medium-speed interface processor 22, and also processing a multiplex signal from the medium-speed interface processor 22 into a digital primary-rate interface signal. The low-speed interface processor 21 corresponds to an interface unit according to the present invention.

More specifically, there are two digital multiplex hierarchical systems according to the CCITT recommendations. A 1.544 Mb/s digital primary-rate interface unit and a 6.312 Mb/s digital secondary-rate interface unit, which belong to one of the systems, or a 2.048 Mb/s digital primary-rate interface unit and an 8.448 Mb/s digital secondary-rate interface unit, which belong to the other system, correspond to the low-speed interface processor 21.

The medium-speed interface processor 22 serves to effect switching and connecting processes including loop back, cross connect, through connection, etc. on a medium-speed interface signal.

A high-speed interface processor 23 processes a medium-speed interface signal into a high-speed multiplex signal, which is outputted as an optical signal through a high-speed interface, and also processes a high-speed multiplex signal into a medium-speed interface signal.

Figure 2:
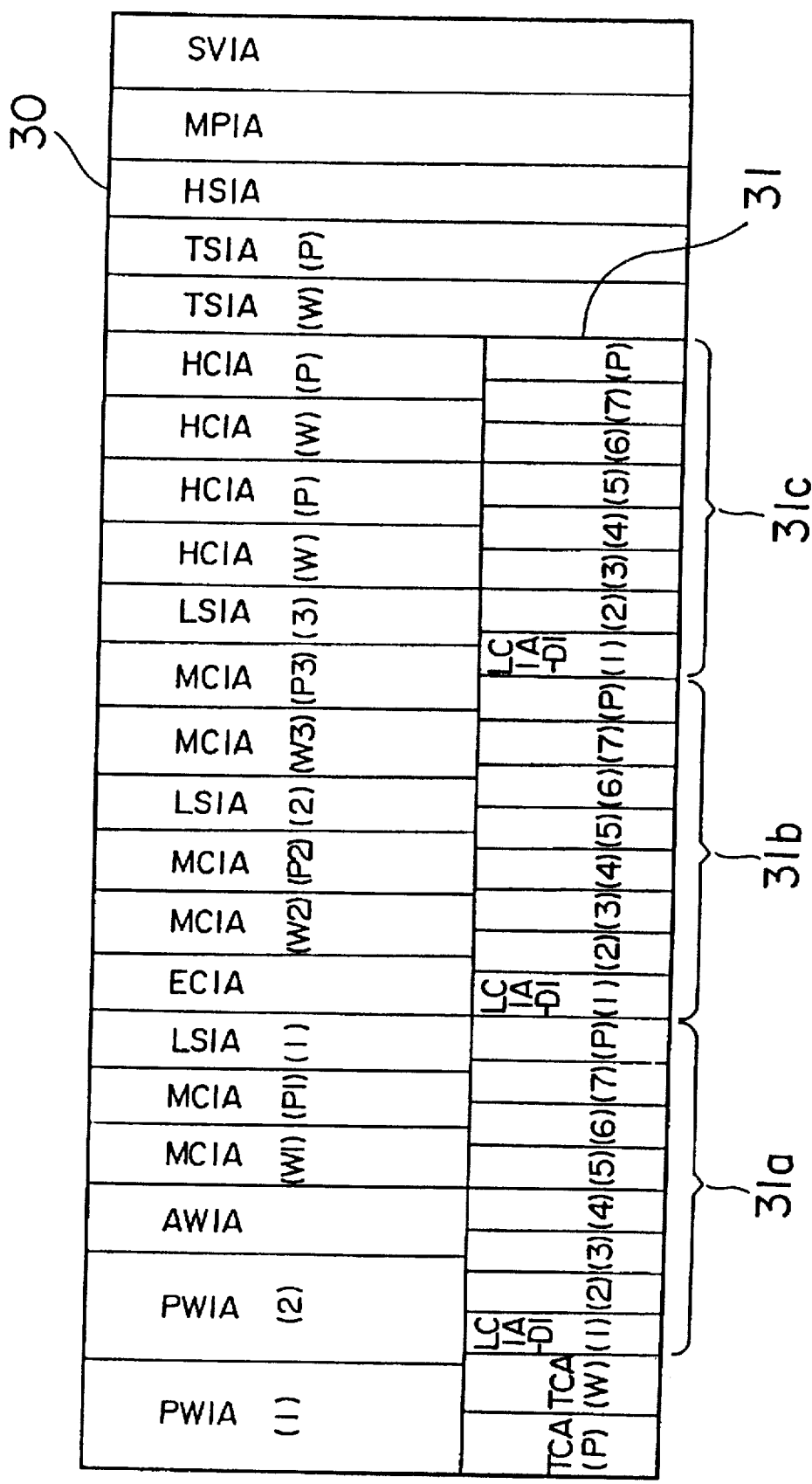
FIG. 2 is a front elevational view of a unit layout of each interface of the hierarchical digital multiplex communication device.

FIG. 2 shows a unit layout of each interface of the hierarchical digital multiplex communication device.

Each interface that constitutes the hierarchical digital multiplex communication device, denoted at 30, is of a shelf structure including a unit group 31 corresponding to the low-speed interface processor 21 and other sections corresponding to the medium-speed interface processor 22 and the high-speed interface processor 23.

The unit group 31 comprises a first group 31a, a second group 31b, and a third group 31c, each composed of 8 plug-in units (cards) of identical construction, Those units which are indicated by (P) are used as supplemental units.

Figure 3:
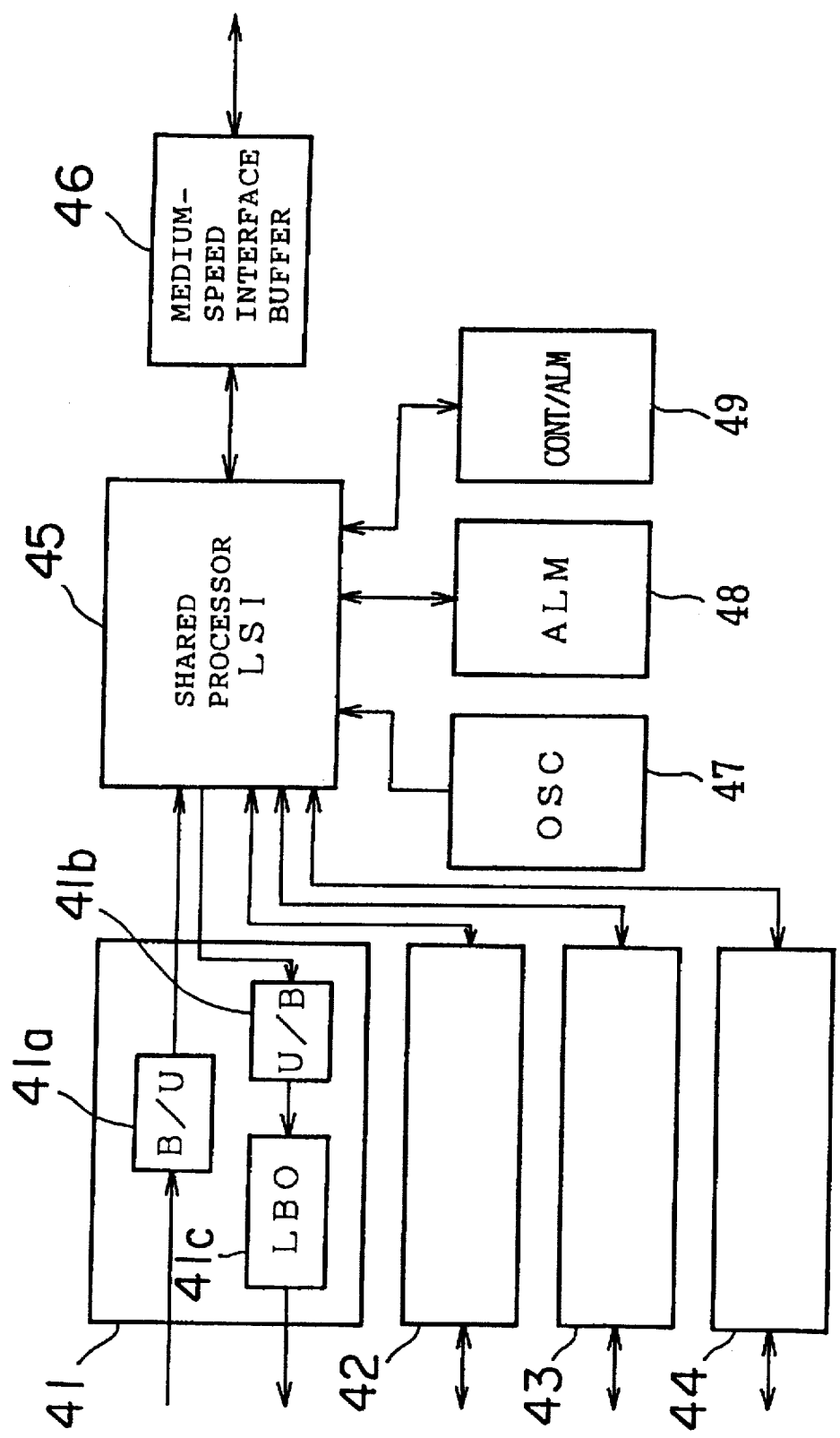
FIG. 3 is a block diagram of a circuit arrangement of an interface unit according to a first embodiment of the present invention.

FIG. 3 shows in block form a circuit arrangement of each unit of the unit group 31 according to a first embodiment of the present invention. In the first embodiment, the unit processes four channels of 1.544 Mb/s primary-rate balanced transmission signals, More specifically, the unit has input/output circuits 41–44 coupled between a shared processor circuit 45 and an external circuit for processing input and output signals, The input/output circuits 41–44 are of an identical structure, and correspond to respective channels, The input/output circuit 41 has a bipolar/unipoLar (B/U) block 41a comprising a converter for converting a digital primary-rate bipolar input signal into a unipolar signal suitable for being processed in the unit, a unipolar/bipolar (U/B) block 41b comprising a converter for converting a unipolar signal outputted from the shared processor LSI circuit 45 into a digital primary-rate bipolar output signal to be outputted to a line-build-out (LBO) block 41c. The LBO block 41c comprises an equalizer which compensates for a cable equivalent characteristic component or a reduction in level of the digital primary-rate bipolar output signal which would be caused by a transmission cable when outputted to the external circuit, The input/output circuits 42–44 also have respective B/U blocks 42a–44a, respective U/B blocks 42b–44b, and respective LBO blocks 42c–44c, which are omitted from illustration in FIG. 3 for the sake of brevity, The shared processor LSI circuit 45 comprises a microprocessor for processing signals of the channels. Specifically, the shared processor LSI circuit 45 processes an input signal supplied from a digital primary-rate interface through the B/U block 41a into a multiplex signal, and outputs the multiplex signal through a medium-speed interface buffer 46 to the medium-speed interface processor 22. The shared processor LSI circuit 45 also separates a signal from a signal inputted from the medium-speed interface processor 22 through the medium-speed interface buffer 46, and outputs the separated signal through the U/B block 41b and the LBO block 41c to the digital primary-rate interface.

The medium-speed interface buffer 46 is connected between the low-speed interface processor 21 and the medium-speed interface processor 22, The unit further includes an oscillator (OSC) block 47 for supplying a clock signal to the shared processor LSI circuit 45, an alarm (ALH) block 48 for monitoring operation of the shared processor LSI circuit 45 and generating fault information, and a control/alarm (CNT/ALM) block 49 for controlling and monitoring buses which connect the blocks in the unit.

Figure 4:
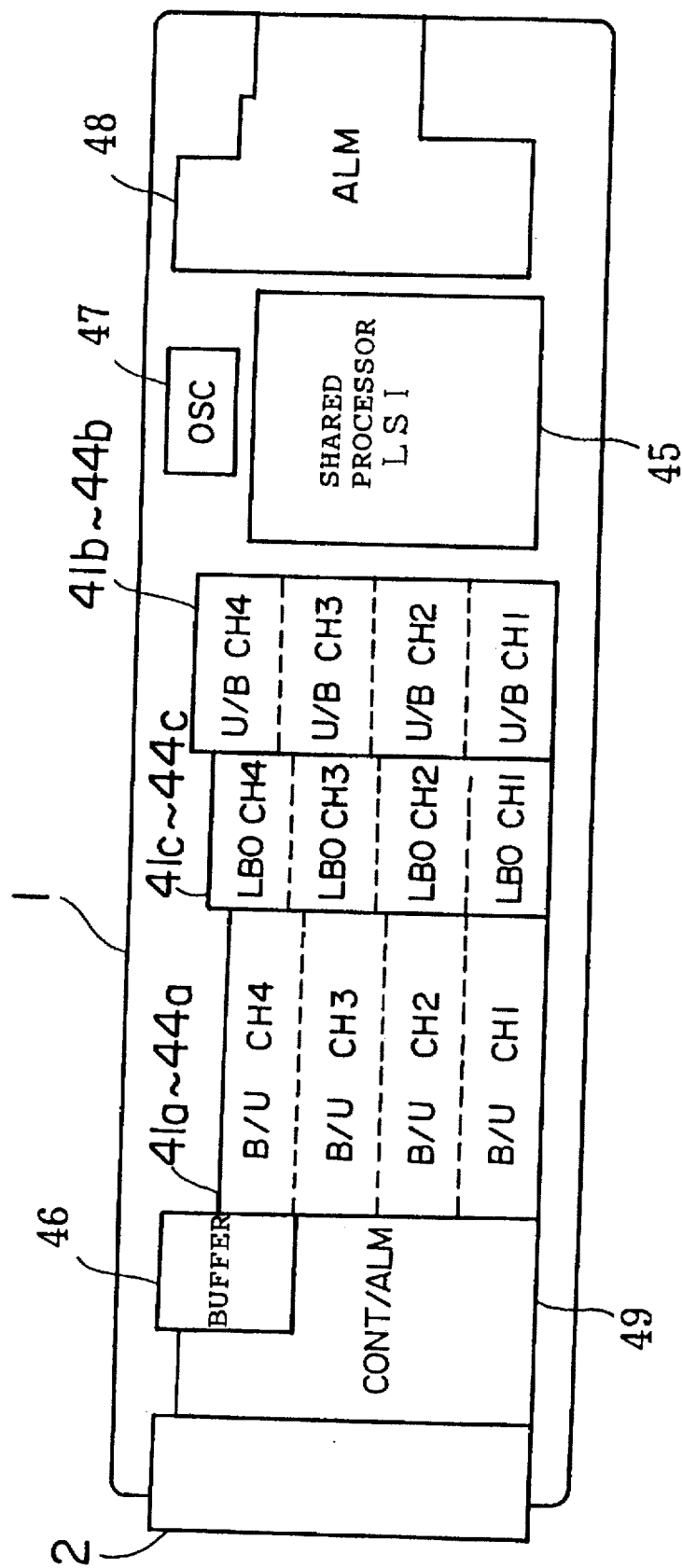
FIG. 4 is a plan view showing a layout of parts blocks of the interface unit shown in FIG. 3.

FIG. 4 shows a layout of the parts blocks in the unit according to the first embodiment, which unit has the circuit arrangement shown in FIG. 3.

The plug-in unit houses the B/U blocks 41a–44a for the four channels, the LBO blocks 41c–44c for the four channels, the U/B blocks 41b–44b for the four channels, and the shared processor LSI circuit 45, the blocks being successively arranged from the rearmost end (lefthand side in FIG. 4) in the order named with the shared processor LSI circuit 45 positioned near the frontmost end. The unit has a printed-wiring board 1 which may be a multilayer printed-wiring board of an elongate rectangular shape having a size of 68×225 mm, with a connector 2 mounted on the rearmost end. The connector 2, which serves to connect the parts on the printed-wiring board 1 to an external circuit, is connected to a connector (not shown) on the communication device 30, The printed-wiring board 1 supports thereon the CONT/ALM block 49, the four-channel B/U blocks 41a–44a, the four-channel LBO blocks 41c–44c the four-channel U/B blocks 41b–44b, and the shared processor LSI circuit 45, which are arranged successively toward the frontmost end in the order named.

The B/U blocks 41a–44a have functional sections for amplifying low-level bipolar signals inputted from the external circuit to a predetermined level, Since noise tends to be introduced into these functional sections, the B/U blocks 41a–44a are required to be positioned as closeLy to the connector 2 as possible and to be spaced from the U/B blocks 41b–44b that handle high-level signals, Furthermore, the B/U blocks 41a–44a, the LBO blocks 41c–44c, and the U/B blocks 41b–44b, which are identical in structure for all the channels, are required to be arranged parallel to each other, The layout shown in FIG. 4 is selected to meet these requirements. Since the printed-wiring board 1 is of an elongate rectangular shape, wiring patterns concentrate in the vicinity of the connector 2. Therefore, the shared processor LSI circuit 45, which is of multiple pins, is located near the frontmost end remote from the connector 2 to prevent the region of the connector 2 from being too crowded.

The medium-speed interface buffer 46 is situated between the CONT/ALM block 49 and the four-channel B/U blocks 41a–44a and also closely to the CONT/ALM block The OSC block 47 and the ALN block 48 are Located near the shared processor LSI circuit.

The flow of main signals through the blocks that are connected as shown in FIG. 3 will be described below with reference to FIG. 5.

Figure 5:
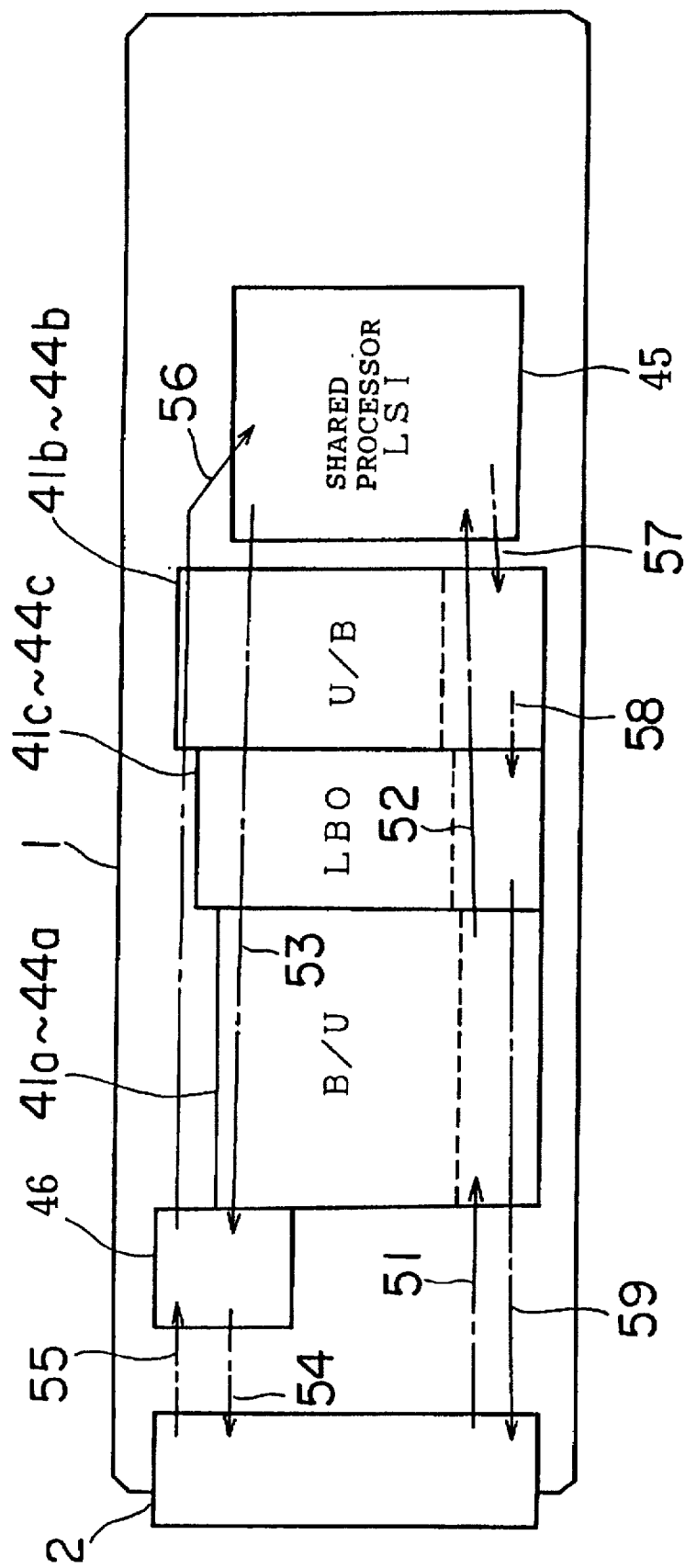
FIG. 5 is a diagram illustrative of flows of main signals in the interface unit shown in FIG. 4.

FIG. 5 shows in plane the unit illustrated in FIG. 4, with the flow of main signals being indicated by dot-and-dash Lines. Those parts blocks which have nothing to do with the flow of main signals are omitted from illustration in FIG. 5, Only the flow of main signals in one channel (input/output circuit 41) is illustrated with respect to the B/U blocks 41a–44a, the LBO blocks 41c–44c, the U/B blocks 41b–44b. Main signals in the other channels also flow in the same manner.

Specifically, a digital primary-rate bipolar input signal flows successively from the connector 2 through a path St, the B/U block 41a, a path 52, the shared processor LSI circuit 45, a path 53, the medium-speed interface buffer 46, and a path 54 back to the connector 2. An input signal from the medium-speed interface flows successively from the connector 2, a path 55, the medium-speed interface buffer 46, a path 56, the shared processor LSI circuit 45, a path 57, the U/B block 41b, a path the LBO block 41c, and a path 59 back to the connector 2.

As described above, the parts of the blocks are arranged along the flow of signals on the printed-wiring board 1 to avoid oscillation due to a positive feedback Loop and introduction of noise for maintaining desired unit characteristics. Pattern wirings between the circuit blocks and pattern wirings between the parts in the circuit blocks, which largeLy affect the unit characteristics, can be optimized by the layout of the parts along the flow of signals.

Figure 6:
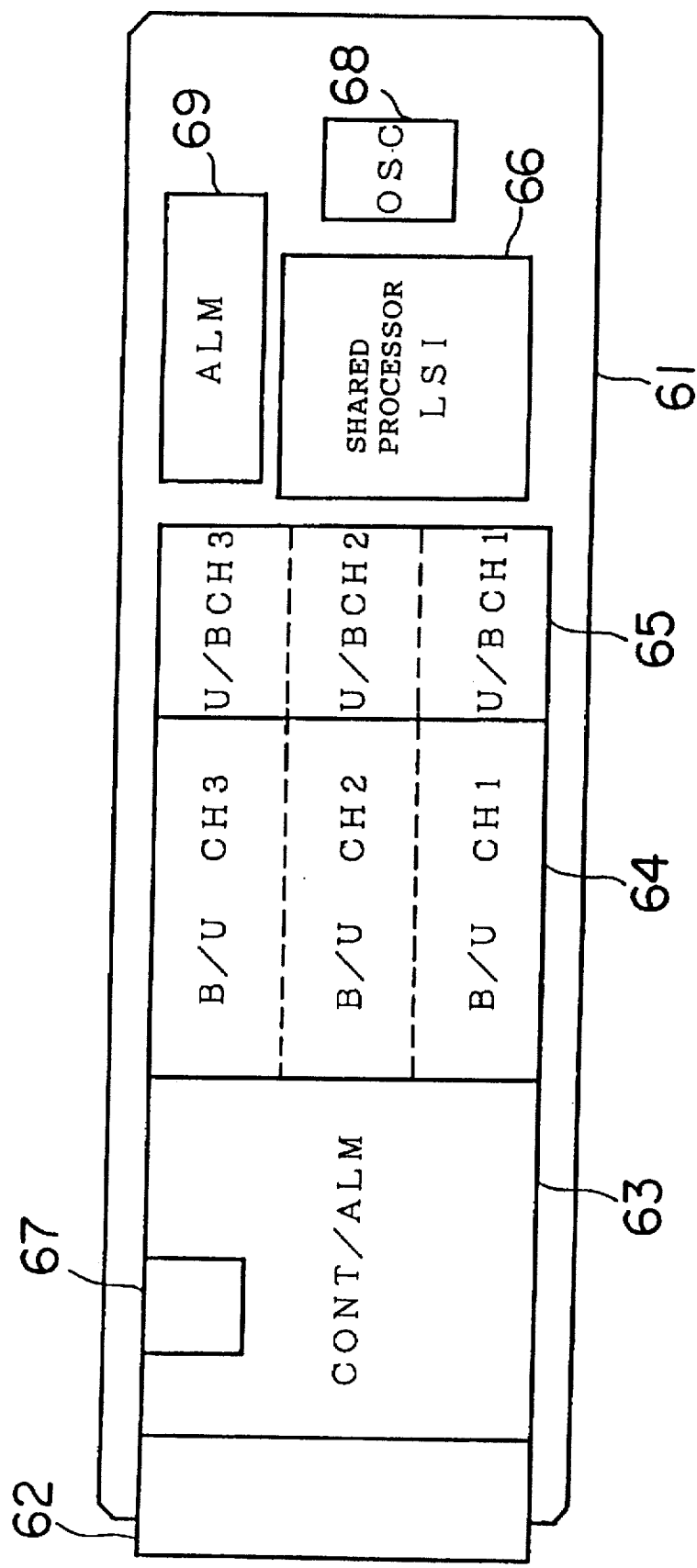
FIG. 6 is a plan view of a layout of parts blocks of an interface unit according to a second embodiment of the present invention.

FIG. 6 shows a layout of parts blocks of an interface unit according to a second embodiment of the present invention. The interface unit shown in FIG. 6 processes three channels of 2.048 Mb/s primary-rate unbalanced transmission signals inputted from a coaxial cable. A circuit arrangement of the interface unit (not shown) according to the second embodiment differs from the circuit arrangement according to the first embodiment shown in FIG. 3 in that no LBO blocks are employed and the number of channels is different.

In FIG. 6, a connector 62 is mounted on the rearmost end (Lefthand end as shown) of a printed-wiring board 61. The interface unit includes a CONT/ALM block 63, B/U blocks 64 and U/B blocks 65 for three channels, and a shared processor LSI circuit 66, the blocks being successively arranged from the connector 62 in the order named toward the frontmost end (righthand as shown).

A medium-speed interface buffer 67 is disposed near the CONT/ALM block 63, and an OSC block 68 and an ALM block 69 are positioned in the vicinity of the shared processor LSI circuit 66.

The above layout of the parts blocks according to the second embodiment is selected for the same reasons as the layout of the parts blocks according to the first embodiment.

The interface unit according to each of the first and second embodiments comprises a digital primary-rate interface unit. However, the Low-speed interface processor 21 shown in FIG. 1 may be replaced with a digital secondary-rate interface unit. Specifically, the interface unit for a communication device according to the present invention may comprise an 8.448 Mb/s digital secondary-rate interface unit or a 6.312 Mb/s digital secondary-rate interface unit according to the CCITT recommendations.

In the above embodiments, the interface unit employs SMT parts. However, the principles of the present invention are also applicable to interface units which employ lead parts according to IMT (insert-mount technology).

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. An interface unit having a digital hierarchy interface function for a communication device, comprising:

a plurality of B/U converter means for converting first bipolar signals in a plurality of channels into a plurality of first unipolar signals, respectively;

a plurality of U/B converter means for converting second unipolar signals in said plurality of channels into a plurality of second bipolar signals, respectively;

connecting means for connecting said plurality of B/U converter means to an external device;

shared processor means interfacing with said plurality of B/U converter means and said plurality of U/B converter means for processing said first and second bipolar signals and said first and second unipolar signals in said plurality of channels;

a printed-wiring board supporting said plurality of B/U converter means, said plurality of U/B converter means, said connecting means, and said shared processor means, wherein said connecting means is located adjacent to said plurality of B/U converter means and said shared processor means is located adjacent to said plurality of U/B converter means so as to prevent introduction of noise from said plurality of U/B converter means into said plurality of B/U converter means; and a plurality of equalizers, each equalizer arranged between each of said plurality of B/U converter means and each of said plurality of U/B converter means on said printed-wiring board and connected to each of said plurality of U/B converter means and said connecting means, for compensating for a transmission cable equivalent characteristic with respect to the second bipolar signals from said plurality of U/B converter means.

* * * * *